July 7, 1936.　　　L. A. WILLIAMS　　　2,047,132
LUBRICATING APPARATUS
Filed Dec. 22, 1933
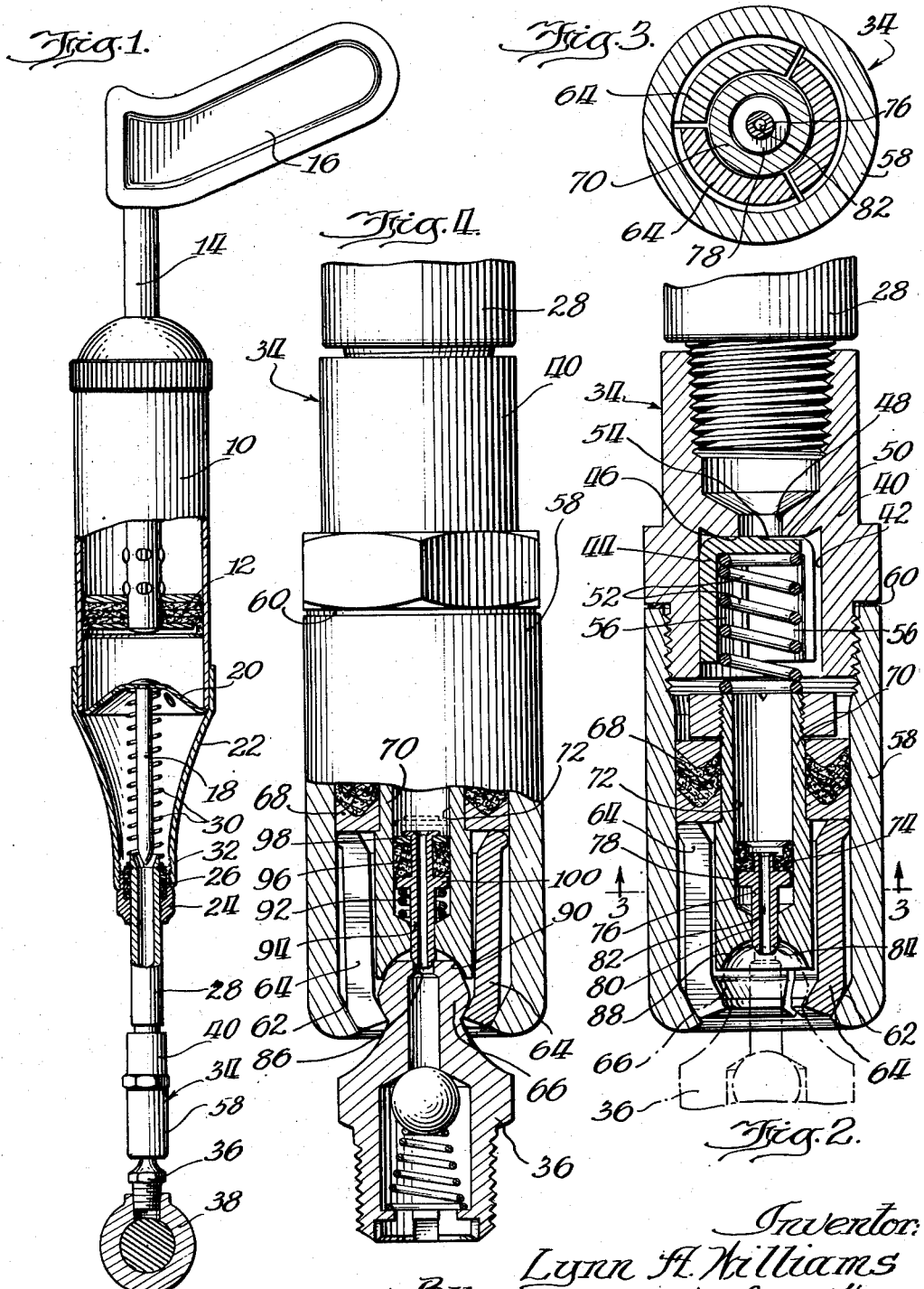

Patented July 7, 1936

2,047,132

UNITED STATES PATENT OFFICE 2,047,132

LUBRICATING APPARATUS

Lynn A. Williams, Evanston, Ill., assignor, by mesne assignments, to Stewart-Warner Corporation, Chicago, Ill., a corporation of Virginia Application December 22, 1933, Serial No. 703,575

3 Claims. (Cl. 285—168)

My invention relates generally to lubricating apparatus and more particularly to improvements in couplers for high pressure lubricating systems.

It is an object of my invention to provide an improved form of coupler for high pressure lubricating systems in which provision is made for making a seal between the coupler and the lubricant receiving fitting which will be effective under high pressure.

A further object of my invention is to provide an improved coupler for high pressure lubricating systems in which dual means are provided for effecting a lubricant tight seal with the lubricant receiving fitting, one of these means being effective when the coupler and receiving fitting are substantially in axial alignment and the other means being effective when the coupler is attached to the fitting at a substantial angle to the axis thereof.

Other objects will appear from the following description, reference being had to the accompanying drawing, in which Figure 1 is an elevation of my improved coupler shown attached to a lubricant compressor, a portion of the latter being shown in central longitudinal section;

Figure 2 is an enlarged longitudinal sectional view of my improved coupler;

Figure 3 is a transverse sectional view taken on the plane of line 3—3 of Figure 2; and Figure 4 is a view similar to Figure 2, showing a modified form of my invention.

In the lubrication of machines equipped with fittings of the type shown in the application of Joseph Bystricky, Serial No. 661,713, filed March 20, 1933, it is occasionally found that the circular dirt-cutting tip of the fitting is nicked or otherwise damaged so that a lubricant-tight seal is not effected by the concave spherical contact surface of the nozzle which is pressed thereagainst. I have therefore provided an additional means to form a seal with the fitting, this means contacting with the circular edge surrounding the inlet opening of the fitting. Because this edge is less liable to accidental damage, being located in a relatively protected position, a tight seal can usually be effected therewith, even though a seal cannot be made against the larger dirt-cutting edge of the fitting.

The coupler of my invention is illustrated as forming a part of a hand-operated lubricant compressor comprising a barrel 10 in which a piston 12 is reciprocable. The piston is carried by a piston rod 14, to the end of which a suitable handle 16 is secured. A high-pressure plunger 18 is preferably riveted to an apertured stamping 20 which is secured against the end of the barrel 10 by the cap 22. A bushing 24, containing packing 26, is threaded in the outer end of the cap 22 and forms a guide for a high-pressure cylinder 28. A compression coil spring 30 normally holds the cylinder 28 in its outer position, as shown in Figure 1, the spring being compressed between the stamping 20 and a split washer 32 which is seated in a suitable groove formed in the outer surface of the cylinder 28 adjacent its inner end.

The coupler designated generally as 34 is threaded to the extremity of the cylinder 28 and is adapted to make a sealed connection with any one of a plurality of fittings, such as 36, threaded in the oil hole of a bearing 38 to be lubricated. This lubricant compressor is intended to be illustrative of any suitable means for discharging lubricant under high pressure with which the improved coupler of my invention may be used.

As shown in Figure 2, the coupler comprises a body 40 suitably threaded at one end for attachment to the cylinder 28 and having an axial bore 42 in the other end forming a chamber for a check-valve 44. The check-valve has a disk portion 46 arranged to close an opening 48 formed in a valve seat 50 against which the disk is pressed by a spring 52. The surface of the disk portion 46 of the check-valve has a shallow, narrow groove 54 formed therein to serve as a highly restricted by-pass around the check-valve when the latter is closed. The check-valve is provided with a plurality of guiding fingers 56 which, through cooperation of the walls of the bore 42, constrain the check-valve to rectilinear movement.

A sleeve 58 is threaded to the outer end of the check-valve body 40, a suitable gasket 60 being interposed between these parts to prevent the escape of lubricant. The outer end of the sleeve 58 has an internal tapering shoulder 62 formed thereon to provide a camming surface for a plurality of jaws 64. The jaws are conformed to be projected beneath the head 66 of a lubricant receiving fitting by the camming surface of the shoulder 62 when the jaws are moved longitudinally outward. The jaws are actuated by an annular piston 68 which is mounted for limited sliding movement upon a nozzle 70.

The nozzle 70 has a cylindrical bore 72 for a piston 74 which is secured to a sealing member 76. The sealing member 76 is guided for longitudinal sliding movement by a cup leather backing flange 78 and projects through a small diameter drilled hole 80 formed in the nozzle 70. The sealing member has a small diameter drilled passageway 82 formed therein, and is tapered at its outer end to form a frusto-conical sealing surface 84. The tip of the sealing member 76 is of sufficiently small diameter readily to enter the inlet opening 86 of the lubricant receiving fitting and is adapted, when the coupler is in substantially axial alignment, to enter the inlet opening and be tightly pressed against the edge thereof to form a seal which will be leakproof under very high pressure. The nozzle 70 has a concave spherical contact surface 88, the radius of curvature of which is substantially the same as that of the spherical portion of the head 66 of the fitting, and which is adapted to contact with the circular dirt-cutting edge 90 of the lubricant receiving fitting.

The spring 52 normally presses the nozzle 70 outwardly and through the piston 68 forces the jaws 64 substantially to the position in which they are shown in Figure 2.

When the coupler is pressed against a lubricant receiving fitting, the jaws slide inwardly, compressing the spring 52 until the jaws spread sufficiently to permit the head 66 of the fitting to pass between them. The spring will then force the jaws outwardly substantially to the position shown in Figure 2, with their end portions beneath the head of the fitting.

Upon operating the compressor by pushing upon the handle 16, the lubricant within the barrel 10 will be placed under pressure, thereby priming the cylinder 28. Application of an increased force to the handle 16 will cause the barrel and plunger 18 to move relative to the cylinder 28, the plunger entering the cylinder and ejecting the lubricant under potential high pressure through the outlet port 48 past the check-valve 44 and into the sleeve 58 above the piston 68. Lubricant pressure exerted upon the piston will force the latter outwardly against the inner ends of the jaws 64 and thereby force the jaws into tight locking engagement with the head of the fitting.

The lubricant pressure will also act upon the nozzle 70 and force the latter outwardly to cause lubricant-tight contact between the spherical contact surface 88 of the nozzle and the dirt-cutting edge 90 of the lubricant-receiving fitting. At the same time the lubricant acting upon the cup leather piston 74 attached to the sealing member 76 will force the latter outwardly, causing its frusto-conical tip to enter the inlet opening of the lubricant-receiving fitting and form a lubricant-tight seal with the edge of the fitting around said opening. The tightness of the seal thus effected is proportional to the pressure at which the lubricant is being supplied and, since the effective area of contact of the sealing member with the fitting is small relative to the area of the cylindrical bore 72, and since the contact between the sealing member and the fitting is substantially a circular line, a very tight seal will be formed.

Ordinarily the nozzle 70 will be forced by the lubricant pressure against the end of the fitting with sufficient force to make the lubricant-tight seal with the fitting between the spherical contact surface 88 of the nozzle and the dirt-cutting edge 90 of the fitting but, should the latter be nicked or damaged in any way, a perfect lubricant seal might not be possible. It is ordinarily possible to connect the coupler to the fitting in a manner such that their axes are in substantial alignment so that sealing member 76 will enter the inlet opening of the fitting. However, under some circumstances, due to obstructing parts of the machine being lubricated, it may be difficult to secure such axial alignment and may be necessary to connect the coupler to the fitting with their axes at a considerable angle relative to one another. Under such circumstances a lubricant-tight seal will be obtained between the dirt-cutting edge 90 of the fitting and the concave spherical contact surface 88 of the nozzle.

The coupler of my invention thus provides a satisfactory means for making a lubricant-tight seal when the coupler and fitting are not in substantial axial alignment and a seal of greater effectiveness when, as is usual, the coupler is connected to the fitting in substantially axial alignment. Furthermore, the contact between the spherical surface 88 and the dirt-cutting edge 90 prevents the escape of lubricant and causes a sufficiently high back pressure to be built up to operate the sealing member 76.

After sufficient lubricant has been discharged into the lubricant-receiving fitting, the pressure within the sleeve 58 is relieved by the escape of lubricant through the by-pass groove 54 formed in the face of the check-valve 44. When the pressure is thus relieved, the coupler may readily be disconnected from the fitting, preferably by tilting it slightly so as to facilitate the displacement of the jaws from their locking position.

In the modified form of my invention disclosed in Figure 4, I have provided a compression coil spring 92 to move the sealing member 94 from operative position when the lubricant pressure is relieved. In this modification the sealing member is shown as being provided with an annular packing 96 held between a washer 98 and a flange 100 forming a part of the sealing member 94, the washer 98 being secured by peening over the inner end of the sealing member 94.

The operation of the modified form of coupler, as shown in Figure 4, is substantially the same as that previously described except that the sealing member 94 is automatically moved from its projected position (to the position shown in dotted lines in Figure 4) whenever lubricant pressure in the coupler is relieved. Thus, during the operation of disconnecting the coupler from the fitting, there is no tendency for the edge of the fitting surrounding the inlet opening to be deformed or damaged by being forcibly pressed against the tip of the sealing member 94, nor is undue strain placed upon the projecting portion of the sealing member. Since the latter is of very small diameter and is necessarily made of relatively hard material, there is a possibility that the tip thereof might be broken should it be subjected to a sudden stress during the operation of disconnecting the coupler from the fitting.

While I have illustrated and described preferred embodiments of my invention, many modifications may be made without departing from the spirit of the invention, and I do not wish to be limited to the precise details set forth but desire to avail myself of all changes within the scope of the appended claims.

I claim:

1. In a high pressure lubricating system, the combination of a lubricant receiving fitting having an enlarged head portion with an inlet opening therein, the head portion of said fitting terminating in a contact face having a circular dirt-cutting edge, a coupler for making a quick detachable lubricant-tight connection with said fitting, said coupler comprising a tubular casing, a plurality of jaws movably mounted within said casing and formed to engage beneath the head of said fitting, lubricant pressure operated means for holding said jaws in locking engagement beneath the head of the fitting, a nozzle within said casing having a spherically concave contact surface for universal sealing engagement with the dirt-cutting edge of said fitting, and a sealing member reciprocable in said nozzle and having a tip of sufficiently small diameter that it may be projected into the inlet opening of said fitting and make sealing contact with the edge surrounding said opening, and a piston for forcing said sealing member into engagement with said fitting.

2. A coupler for high pressure lubricating apparatus comprising a casing, means for detachably securing said casing to a lubricant receiving fitting, a lubricant pressed nozzle within said casing and having a concave spherical contact face for making a sealed connection with the end of a lubricant receiving fitting, said nozzle having a bore therein, a piston reciprocable in said bore, said piston having a sealing element secured thereto, said sealing element having a portion of small diameter projectable through the concave spherical contact surface of said nozzle and having a tapered extremity engageable with the edge surrounding the inlet opening of the lubricant receiving fitting, and resilient means to move said sealing member away from the fitting.

3. In a high pressure lubricant system, the combination of a lubricant receiving fitting having an enlarged head portion with an inlet opening therein, the head portion of said fitting terminating in a contact face having a circular dirt-cutting edge, a coupler for making a quick detachable lubricant-tight connection with said fitting, said coupler comprising a tubular casing, a plurality of jaws movably mounted within said casing and formed to engage beneath the head of said fitting, lubricant pressure operated means for holding said jaws in locking engagement beneath the head of the fitting, a nozzle within said casing having a spherically concave contact surface for universal sealing engagement with the dirt-cutting edge of said fitting, and a sealing member reciprocable in said nozzle and having a tip of sufficiently small diameter that it may be projected into the inlet opening of a fitting and make sealing contact with the edge surrounding said opening, a piston for forcing said sealing member into engagement with said fitting, and a spring for moving said sealing member away from said fitting.

LYNN A. WILLIAMS.